(12) United States Patent
Becker et al.

(10) Patent No.: US 7,978,827 B1
(45) Date of Patent: Jul. 12, 2011

(54) AUTOMATIC CONFIGURATION OF CALL HANDLING BASED ON END-USER NEEDS AND CHARACTERISTICS

(75) Inventors: Gary Becker, Thornton, CO (US); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 1534 days.

(21) Appl. No.: 10/882,975

(22) Filed: Jun. 30, 2004

(51) Int. Cl.
*H04M 11/00* (2006.01)

(52) U.S. Cl. ............ 379/52; 379/90.01; 379/93.17

(58) Field of Classification Search ........... 379/52, 379/90.01, 93.15, 93.17; 370/352
See application file for complete search history.

(56) References Cited

U.S. PATENT DOCUMENTS

| | | |
|---|---|---|
| 4,791,660 A | 12/1988 | Oye et al. |
| 5,067,127 A | 11/1991 | Ochiai |
| 5,206,903 A | 4/1993 | Kohler et al. |
| 5,506,872 A | 4/1996 | Mohler |
| 5,594,740 A | 1/1997 | LaDue |
| 5,604,786 A | 2/1997 | Engelke et al. |
| 5,724,405 A | 3/1998 | Engelke et al. |
| 5,724,416 A | 3/1998 | Foladare et al. |
| 5,802,058 A | 9/1998 | Harris et al. ............ 370/410 |
| 5,828,747 A | 10/1998 | Fisher et al. |
| 5,878,029 A | 3/1999 | Hasegawa et al. |
| 5,905,793 A | 5/1999 | Flockhart et al. |
| 5,933,425 A | 8/1999 | Iwata |
| 5,946,618 A | 8/1999 | Agre et al. |
| 5,953,312 A | 9/1999 | Crawley et al. |
| 5,961,572 A | 10/1999 | Craport et al. |
| 5,982,873 A | 11/1999 | Flockhart et al. |
| 6,002,933 A | 12/1999 | Bender et al. |
| 6,021,178 A | 2/2000 | Locke et al. |
| 6,038,214 A | 3/2000 | Shionozaki |
| 6,058,163 A | 5/2000 | Pattison et al. |
| 6,061,431 A * | 5/2000 | Knappe et al. ............ 379/52 |
| 6,067,300 A | 5/2000 | Baumert et al. |
| 6,073,013 A | 6/2000 | Agre et al. |
| 6,088,732 A | 7/2000 | Smith et al. |
| 6,122,665 A | 9/2000 | Bar et al. |
| 6,163,607 A | 12/2000 | Bogart et al. |
| 6,173,053 B1 | 1/2001 | Bogart et al. |
| 6,185,527 B1 | 2/2001 | Petkovic et al. |
| 6,192,122 B1 | 2/2001 | Flockhart et al. |
| 6,212,275 B1 | 4/2001 | Akhteruzzaman |
| 6,249,757 B1 | 6/2001 | Cason |
| 6,256,300 B1 | 7/2001 | Ahmed et al. |

(Continued)

FOREIGN PATENT DOCUMENTS

CA    2319655    6/2001

(Continued)

OTHER PUBLICATIONS

U.S. Appl. No. 12/748,094, filed Mar. 26, 2010, Gentle et al.

(Continued)

*Primary Examiner* — Melur Ramakrishnaiah
(74) *Attorney, Agent, or Firm* — Sheridan Ross P.C.

(57) ABSTRACT

A computational component for establishing a communication between a contactor and a contactee is provided that includes a user configuration agent 324 operable to (a) determine a network configuration requirement resulting from a disability of at least one of the contactor and the contactee, (b) incorporate the disability network configuration requirement in a communication set-up message; and (c) forward the communication set-up message to a communication device associated with the contactee.

26 Claims, 6 Drawing Sheets

U.S. PATENT DOCUMENTS

| | | |
|---|---|---|
| 6,349,136 B1 | 2/2002 | Light et al. |
| 6,374,302 B1 | 4/2002 | Galasso et al. |
| 6,381,472 B1 * | 4/2002 | LaMedica et al. ............. 379/52 |
| 6,381,639 B1 | 4/2002 | Thebaut et al. |
| 6,421,425 B1 * | 7/2002 | Bossi et al. ..................... 379/52 |
| 6,434,628 B1 | 8/2002 | Bowman-Amuah |
| 6,453,022 B1 | 9/2002 | Weinman, Jr. |
| 6,463,470 B1 | 10/2002 | Mohaban et al. |
| 6,463,474 B1 | 10/2002 | Fuh et al. |
| 6,469,991 B1 | 10/2002 | Chuah |
| 6,490,343 B2 * | 12/2002 | Smith et al. ..................... 379/52 |
| 6,490,556 B1 | 12/2002 | Graumann et al. |
| 6,498,791 B2 | 12/2002 | Pickett et al. |
| 6,502,131 B1 | 12/2002 | Vaid et al. |
| 6,526,140 B1 | 2/2003 | Marchok et al. |
| 6,529,475 B1 | 3/2003 | Wan et al. |
| 6,529,499 B1 | 3/2003 | Doshi et al. |
| 6,532,241 B1 | 3/2003 | Ferguson et al. |
| 6,546,082 B1 * | 4/2003 | Alcendor et al. ............. 379/52 |
| 6,563,794 B1 | 5/2003 | Takashima et al. |
| 6,578,077 B1 | 6/2003 | Rakoshitz et al. |
| 6,601,101 B1 | 7/2003 | Lee et al. |
| 6,618,368 B1 | 9/2003 | Tanigawa et al. |
| 6,628,611 B1 | 9/2003 | Mochizuki |
| 6,647,270 B1 | 11/2003 | Himmelstein |
| 6,665,637 B2 | 12/2003 | Bruhn |
| 6,668,042 B2 | 12/2003 | Michaelis |
| 6,678,250 B1 | 1/2004 | Grabelsky et al. |
| 6,724,862 B1 * | 4/2004 | Shaffer et al. ................... 379/52 |
| 6,725,128 B2 | 4/2004 | Hogg et al. |
| 6,727,767 B2 | 4/2004 | Takada |
| 6,754,710 B1 | 6/2004 | McAlear |
| 6,760,312 B1 | 7/2004 | Hitzeman |
| 6,760,774 B1 | 7/2004 | Soumiya et al. |
| 6,765,905 B2 | 7/2004 | Gross et al. |
| 6,778,534 B1 | 8/2004 | Tal et al. |
| 6,792,092 B1 | 9/2004 | Michalewicz |
| 6,798,751 B1 | 9/2004 | Voit et al. |
| 6,798,786 B1 | 9/2004 | Lo et al. |
| 6,807,564 B1 | 10/2004 | Zellner et al. |
| 6,857,020 B1 | 2/2005 | Chaar et al. |
| 6,914,964 B1 * | 7/2005 | Levine ............................ 379/52 |
| 6,954,435 B2 | 10/2005 | Billhartz et al. |
| 6,964,023 B2 | 11/2005 | Maes et al. |
| 6,973,033 B1 | 12/2005 | Chiu et al. |
| 6,980,516 B1 | 12/2005 | Wibowo et al. |
| 6,988,133 B1 | 1/2006 | Zavalkovsky et al. |
| 7,003,462 B2 | 2/2006 | Shambaugh et al. |
| 7,003,574 B1 | 2/2006 | Bahl |
| 7,010,097 B2 | 3/2006 | Zellner et al. |
| 7,010,581 B2 * | 3/2006 | Brown et al. ................. 709/218 |
| 7,031,311 B2 | 4/2006 | MeLampy et al. |
| 7,031,327 B2 | 4/2006 | Lu |
| 7,043,435 B2 | 5/2006 | Knott et al. |
| 7,046,646 B2 | 5/2006 | Kilgore |
| 7,075,922 B2 | 7/2006 | Mussman et al. |
| 7,076,540 B2 * | 7/2006 | Kurose et al. ................. 709/223 |
| 7,076,568 B2 | 7/2006 | Philbrick et al. |
| 7,089,189 B2 | 8/2006 | Lipe et al. |
| 7,099,440 B2 * | 8/2006 | Michaelis ...................... 379/52 |
| 7,103,542 B2 | 9/2006 | Doyle |
| 7,124,205 B2 | 10/2006 | Craft et al. |
| 7,165,035 B2 | 1/2007 | Zinser et al. |
| 7,170,855 B1 | 1/2007 | Mo et al. |
| 7,170,977 B2 * | 1/2007 | Doherty et al. ................. 379/52 |
| 7,177,945 B2 | 2/2007 | Hong et al. |
| 7,184,434 B2 | 2/2007 | Ganti et al. |
| 7,212,969 B1 | 5/2007 | Bennett |
| 7,221,660 B1 | 5/2007 | Simonson et al. |
| 7,249,024 B2 | 7/2007 | Engstrom |
| 7,251,640 B2 | 7/2007 | Baumard |
| 7,257,120 B2 | 8/2007 | Saunders et al. |
| 7,260,439 B2 | 8/2007 | Foote et al. |
| 7,266,499 B2 | 9/2007 | Surace et al. |
| 7,269,252 B2 | 9/2007 | Eran |
| 7,272,563 B2 | 9/2007 | Nelson |
| 7,290,059 B2 | 10/2007 | Yadav |
| 7,295,555 B2 | 11/2007 | Elzur |
| 7,299,185 B2 | 11/2007 | Falcon et al. |
| 7,319,961 B2 | 1/2008 | Al-Dhubaib et al. |
| 7,321,591 B2 | 1/2008 | Daniel et al. |
| 7,349,851 B2 | 3/2008 | Zuberec et al. |
| 7,359,979 B2 | 4/2008 | Gentle et al. |
| 7,362,745 B1 | 4/2008 | Cope et al. |
| 7,363,371 B2 | 4/2008 | Kirkby et al. |
| 7,376,564 B2 | 5/2008 | Selg et al. |
| 7,398,212 B2 | 7/2008 | Yacoub |
| 7,437,297 B2 | 10/2008 | Chaar et al. |
| 7,454,351 B2 | 11/2008 | Jeschke et al. |
| 7,474,627 B2 | 1/2009 | Chheda et al. |
| 7,496,661 B1 | 2/2009 | Morford et al. |
| 7,502,741 B2 | 3/2009 | Finke et al. |
| 7,509,260 B2 | 3/2009 | Cross, Jr. et al. |
| 7,519,536 B2 | 4/2009 | Maes et al. |
| 7,565,415 B1 | 7/2009 | Markowitz et al. |
| 2001/0012993 A1 | 8/2001 | Attimont et al. |
| 2001/0036157 A1 | 11/2001 | Blanc et al. |
| 2001/0039210 A1 | 11/2001 | St-Denis |
| 2002/0080808 A1 | 6/2002 | Leung |
| 2002/0085703 A1 | 7/2002 | Proctor |
| 2002/0091843 A1 | 7/2002 | Vaid |
| 2002/0105911 A1 | 8/2002 | Pruthi et al. |
| 2002/0116522 A1 | 8/2002 | Zelig |
| 2002/0143971 A1 | 10/2002 | Govindarajan et al. |
| 2002/0152319 A1 | 10/2002 | Amin et al. |
| 2002/0176404 A1 | 11/2002 | Girard |
| 2003/0002650 A1 * | 1/2003 | Gruchala et al. ............. 379/245 |
| 2003/0016653 A1 | 1/2003 | Davis |
| 2003/0016876 A1 | 1/2003 | Chai et al. |
| 2003/0086515 A1 | 5/2003 | Trans et al. |
| 2003/0120789 A1 | 6/2003 | Hepworth et al. |
| 2003/0223431 A1 | 12/2003 | Chavez et al. |
| 2003/0227878 A1 | 12/2003 | Krumm-Heller |
| 2004/0073641 A1 | 4/2004 | Minhazuddin et al. |
| 2004/0073690 A1 | 4/2004 | Hepworth et al. |
| 2005/0064899 A1 | 3/2005 | Angelopoulos et al. |
| 2005/0119892 A1 | 6/2005 | Agapi et al. |
| 2005/0119894 A1 | 6/2005 | Cutler et al. |
| 2005/0125229 A1 | 6/2005 | Kurzweil |
| 2005/0125230 A1 | 6/2005 | Haas |
| 2005/0131697 A1 | 6/2005 | Brown et al. |
| 2005/0131698 A1 | 6/2005 | Tischer |
| 2005/0131699 A1 | 6/2005 | Fukada |
| 2005/0131700 A1 | 6/2005 | Washburn et al. |
| 2005/0154590 A1 | 7/2005 | Coffey et al. |
| 2005/0177370 A1 | 8/2005 | Hwang et al. |
| 2005/0180323 A1 | 8/2005 | Beightol et al. |
| 2005/0186933 A1 | 8/2005 | Trans |
| 2005/0192808 A1 | 9/2005 | Sugiyama |
| 2005/0203746 A1 | 9/2005 | Obata |
| 2005/0216268 A1 | 9/2005 | Kannappan |
| 2005/0228673 A1 | 10/2005 | Nefian et al. |
| 2005/0228674 A1 | 10/2005 | Gunn et al. |
| 2005/0228675 A1 | 10/2005 | Trinkel et al. |
| 2005/0240409 A1 | 10/2005 | Gallistel |
| 2005/0240410 A1 | 10/2005 | Charles et al. |
| 2005/0240412 A1 | 10/2005 | Fujita |
| 2005/0240413 A1 | 10/2005 | Asano et al. |
| 2005/0246173 A1 | 11/2005 | Creamer et al. |
| 2005/0246174 A1 | 11/2005 | DeGolia |
| 2005/0256717 A1 | 11/2005 | Miyata et al. |
| 2005/0261035 A1 * | 11/2005 | Groskreutz et al. ....... 455/569.2 |
| 2005/0261907 A1 | 11/2005 | Smolenski et al. |
| 2005/0273339 A1 | 12/2005 | Chaudhari et al. |
| 2005/0278148 A1 | 12/2005 | Bader et al. |
| 2005/0278177 A1 | 12/2005 | Gottesman |
| 2005/0278178 A1 | 12/2005 | Girouard et al. |
| 2005/0283366 A1 | 12/2005 | Lee |
| 2005/0283367 A1 | 12/2005 | Ativanichayaphong et al. |
| 2005/0283368 A1 | 12/2005 | Leung |
| 2005/0288933 A1 | 12/2005 | Nakamura et al. |
| 2005/0288934 A1 | 12/2005 | Omi |
| 2005/0288935 A1 | 12/2005 | Lee et al. |
| 2006/0004579 A1 | 1/2006 | Claudatos et al. |
| 2006/0009979 A1 | 1/2006 | McHale et al. |
| 2006/0009980 A1 | 1/2006 | Burke et al. |
| 2006/0020468 A1 | 1/2006 | Hilliard |

| | | | |
|---|---|---|---|
| 2006/0020469 | A1 | 1/2006 | Rast |
| 2006/0031073 | A1 | 2/2006 | Anglin et al. |
| 2006/0036440 | A1 | 2/2006 | Kunkel |
| 2006/0047515 | A1 | 3/2006 | Connors |
| 2006/0067486 | A1 | 3/2006 | Zellner et al. |
| 2006/0069568 | A1 | 3/2006 | Passaretti et al. |
| 2006/0069570 | A1 | 3/2006 | Allison et al. |
| 2006/0069779 | A1 | 3/2006 | Sundqvist et al. |
| 2006/0074679 | A1 | 4/2006 | Pifer et al. |
| 2006/0074681 | A1 | 4/2006 | Janiszewski et al. |
| 2006/0074682 | A1 | 4/2006 | Chou et al. |
| 2006/0080103 | A1 | 4/2006 | Van Breemen |
| 2006/0080104 | A1 | 4/2006 | Dang |
| 2006/0100879 | A1 | 5/2006 | Jakobsen et al. |
| 2006/0100880 | A1 | 5/2006 | Yamamoto et al. |
| 2006/0100881 | A1 | 5/2006 | He |
| 2006/0100882 | A1 | 5/2006 | Eves et al. |
| 2006/0100883 | A1 | 5/2006 | Miyamoto et al. |
| 2006/0106610 | A1 | 5/2006 | Napper |
| 2006/0106611 | A1 | 5/2006 | Krasikov et al. |
| 2006/0106613 | A1 | 5/2006 | Mills |
| 2006/0116880 | A1 | 6/2006 | Gober |
| 2006/0116881 | A1 | 6/2006 | Umezawa et al. |
| 2006/0129405 | A1 | 6/2006 | Elfanbaum |
| 2006/0136217 | A1 | 6/2006 | Mullin |
| 2006/0143014 | A1 | 6/2006 | Cheng et al. |
| 2006/0143015 | A1 | 6/2006 | Knott et al. |
| 2006/0161440 | A1 | 7/2006 | Nakayama et al. |
| 2006/0167694 | A1 | 7/2006 | Mitsuyoshi |
| 2006/0167695 | A1 | 7/2006 | Spille et al. |
| 2006/0173688 | A1 | 8/2006 | Whitham |
| 2006/0190262 | A1 | 8/2006 | Roskind |
| 2006/0195322 | A1 | 8/2006 | Broussard et al. |
| 2006/0217985 | A1 | 9/2006 | Noguchi et al. |
| 2006/0235693 | A1 | 10/2006 | Ruderman et al. |
| 2006/0247931 | A1 | 11/2006 | Caskey et al. |
| 2006/0247932 | A1 | 11/2006 | Yamamoto |
| 2007/0103317 | A1 | 5/2007 | Zellner et al. |
| 2007/0133403 | A1 | 6/2007 | Hepworth et al. |
| 2007/0168195 | A1 | 7/2007 | Wilkin et al. |
| 2007/0172083 | A1 | 7/2007 | Tseng et al. |
| 2008/0117869 | A1 | 5/2008 | Freen et al. |
| 2008/0151886 | A1 | 6/2008 | Gentle et al. |
| 2008/0151898 | A1 | 6/2008 | Gentle et al. |
| 2008/0151921 | A1 | 6/2008 | Gentle et al. |

FOREIGN PATENT DOCUMENTS

| | | |
|---|---|---|
| EP | 0982920 | 3/2000 |
| EP | 1549035 | 6/2005 |
| WO | WO 91/14278 | 9/1991 |
| WO | WO 98/46035 | 10/1998 |
| WO | WO 99/51038 | 10/1999 |
| WO | WO 00/41090 | 7/2000 |
| WO | WO 00/72563 | 11/2000 |
| WO | WO 01/26393 | 4/2001 |
| WO | WO 01/75705 | 10/2001 |
| WO | WO 02/00316 | 1/2002 |

OTHER PUBLICATIONS

Application Note, Emergency 911 in Packet Networks, http:www.fastcomm.com/NewWeb/solutions/e911.html, Sep. 5, 2001, FastComm Communications Corporation, 3 pgs.

Baker (Editor), "Requirements for IP Version 4 Routers", RFC 1812, Jun. 1995, 175 pages.

Benjamin W. Wah, et al., "A Survey of Error-Concealment Schemes for Real-Time Audio and Video Transmissions over the Internet," Department of Electrical and Computer Engineering and the Coordinate Science Laboratory, University of Illinois at Urbana-Champaign, Proc. IEEE Int'l Symposium on Multimedia Software Engineering, Dec. 2000.

Bernet et al., "Specification of the Null Service Type", RFC 2997, Nov. 2000, 12 pages.

Bernet, "Format of the RVSP DCLASS Object", RFC 2996, Nov. 2000, 9 pages.

Berney et al., "A Framework for Integrated Services Operation over Diffserv Networks", RFC 2998, Nov. 2000, 29 pages.

Braden et al. "Resource ReSerVation Protocol (RSVP)", RFC 2205, Sep. 1997, 6 pages.

Brown, I. Internet Engineering Task Force, Securing Prioritised Emergency Traffic, http://www.iepscheme.net/docs/draft-brown-ieps-sec-00.txt, Jul. 5, 2001, pp. 1-12.

Carlberg, Ken. Internet Engineering Task Force, Framework for Supporting IEPS in IP Telephony, http://www.iepscheme.net/docs/draft-carlberg-ieps-framework-01.tex, Jul. 4, 2001, pp. 1-24.

Chan et al., "COPS Usage for Policy Provisioning (COPS-PR)", RFC 3084, Mar. 2001, 32 pages.

Cisco Systems, "Cisco Emergency Responder Version 1.1 Data Sheet" (Oct. 2001), 5 pages, copyright 1992-2001.

Ejaz Mahfuz; "Packet Loss Concealment for Voice Transmission Over IP Networks" (2001) (Master thesis, Department of Electrical Engineering, McGill University) (on file with author).

Floyd et al., "Random Early Detection Gateways for Congestion Avoidance", IEEE/ACM Transaction on Networking, Aug. 1993, 22 pages.

Geeta Desai Chennubhotla, "Embedded Systems: Rough start, but voice market growing," EE Times, at http://www.eetimes.com/in_focus/embedded_systems/EOG20020503S0067 (May 6, 2002).

Getting Started with the Cisco IP Phone 7960/7940, pp. 1-1 to 1-4, date unknown.

Government Emergency Telecommunications Service (GETS), "White Paper on IP Teleponhy A Roadmap to Supporting GETS in IP Networks," Apr. 27, 2000, Science Applications International Corporation, pp. 1-32.

Grigonis, Computer Telephony Encyclopedia, pp. 268-277 (2000).

Handley et al., "SIP: Session Initiation Protocol", RFC 2543, Mar. 1999, 81 pages.

Herzog et al., "COPS Usage for RSVP", RFC 2749, Jan. 2000, 16 pages.

Huai-Rong Shao et al., "A New Framework for Adaptive Multimedia over the Next Generation Internet," Microsoft Research China date unknown 4 pages.

IEEE Standards for Information Technology—Telecommunications and information exchange between systems—Local and metropolitan area networks—Common specifications—Part 3: Media Access Control (MAC) Bridges, LAN/MAN Standards Committee of the IEEE Computer Society, ANSI/IEEE Std 802.1D (1998).

IEEE Standards for Local and Metropolitan Area Networks: Virtual Bridged Local Area Networks, The Institute of Electrical and Electronics Engineers, IEEE Std 802.1Q-1998 (Mar. 8, 1999).

International Emergency Preference Scheme (IEPS), http://www.iepscheme.net/, Jun. 16, 2000, pp. 1-2.

International Engineering Consortium, "Silence Suppression and Comfort Noise Generation" at http://www.iec.org/online/tutorials/voice_qual/topic07.html (Jul. 1, 2002).

International Telecommunication Union; "General Aspects of Digital Transmission Systems: Coding of Speech at 8kbit/s Using Conjugate-Structure Algebraic-Code-Excited Linear-Prediction" (CS-ACELP) ITU-T Recommendation G.729 (Mar. 1996).

ITU, "Packet-based multimedia communications systems", H. 323, Feb. 1998, 125 pages.

J. Heinanen et al., "Assured Forwarding PHB Group," Network Working Group, Category: Standards Track (Jun. 1999).

K. Nichols, Cisco Systems, RFC 2474, Definition of Differentiated Services Field in IPv4 & IPv6 Headers, Dec. 1998.

Kathy Lynn Hewitt, Desktop Video Conferencing: A Low Cost and Scalable Solution to Distance Education, "Chapter 2—Internet Conferencing Protocols" thesis submitted to North Carolina State University (1997), at http://www2.ncsu.edu/eos/service/ece/project/succeed_info/klhewitt/thesis/toc.html.

McCloghrie et al., "Structure of Policy Provisioning Information (SPPI)", RFC 3159, Aug. 2001, 38 pages.

PacketCable, Cable Labs, http://www.packetcable.com, copyright 2000-2002.

PacketCableTM Dynamic Quality-of-Service Specification PKT-SP-DQOS-102-000818, 2000, Cable Television Laboratories, Inc., 211 pages.

Paul Roller Michaelis, "Speech Digitization and Compression", Int'l Encyclopedia of Ergonomic and Human Factors (W. Warkowski ed., Taylor & Francis 2001).

Peter Parnes, "Real-time Transfer Protocol (RTP)" (Sep. 8, 1997), at www.cdt.luth.se/~peppar/docs/lic/html/node166.html.

S. Blake et al., "An Architecture for Differentiated Services," Network Working Group, Category: Informational (Dec. 1998).

Sangeun Han et al., "Transmitting Scalable Video over a DiffServ network," EE368C Project Proposal (Jan. 30, 2001).

Schulzrinne. Providing Emergency Call Services for SIP-based Internet Telephony, http//www.softarmor.com/sipping/drafts/draft-schulzrinne-sip-911-00.txt., Jul. 13, 2000, pp. 1-13.

TechTarget, "voice activation detection," at http://searchnetworking.te...m/sDefinition/0,,sid7_gci342466.00.html (Jul. 1, 2002).

V. Jacobson et al., "An Expedited Forwarding PHB," Network Working Group, Category: Standards Track (Jun. 1999).

Wroclawski, "The use of RSVP with IETF Integrated Services", RFC 2210, Sep. 1997, 31 pages.

"Packet Loss and Packet Loss Concealment Technical Brief," Nortel Networks at http://www.nortelnetworks.com (2000).

"Telogy Networks' Voice Over Packet White Paper," Telogy Networks, Inc., available at http://www.telogy.com/our_products/golden_gateway/VOPwhite.html (Jan. 1998).

"Voice over packet: An assessment of voice performance on packet networks white paper," Nortel Networks, Publication No. 74007.25/09-01, at http://www.nortelnetworks.com (2001).

"Access for 9-1-1 and Telephone Emergency Services," American with Disabilities Act, U.S. Department of Justice (Jul. 15, 1998), available at http://www.usdoj.gov/crt/ada/911ta.htm, 11 pages.

Schulzrinne, "Emergency Call Services for SIP-based Internet Telephony," Internet Engineering Task Force (Mar. 25, 2001), pp. 1-17.

"Comments of the National Association of State Utility Consumer Advocates," filed with the Federal Communications Commission, Washington, D.C. (May 28, 2004), pp. 1-74.

"NANPA ANI II Digits," NeuStar, Inc. (2003), available at http://www.nanpa.com/number_resource_info/ani_ii_assignments.html, 5 pages.

Le Boudec, Jean-Yves et al., slideshow entitled Quality of Service in IP Networks (2), Queue Management (undated), pp. 1-30.

RADVision, "SIP: Protocol Overview," (2001), pp. 1-16.

U.S. Appl. No. 12/240,119, filed Sep. 29, 2008, Hepworth et al.

U.S. Appl. No. 12/133,533, filed Jun. 5, 2008, Kloberdans et al.

U.S. Appl. No. 11/671,733, filed Feb. 6, 2007, Beck et al.

3COM, 3Com IP Conferencing and Presence Modules, Dec. 2006, pp. 1-2, http://www.3com.com/other/pdfs/products/en_US/3com_400867.pdf.

Chelston Call Systems, How Audio Conferencing Can Benefit Your Organisation, Jan. 2, 2008, pp. 1-3, http://www.chelston.co.uk/Welcome/Pages/Products/Audio-Conferencing.htm.

Ditech Networks, Conferencing Voice Quality and Echo Cancellation, (undated) (printed Jan. 2, 2008), pp. 1-4, http://www.ditechcom.com/solutions/solutionsdetail.aspx?pid=44.

Global IP Solutions, Backgrounder, (undated) (printed Jan. 2, 2008), pp. 2-6, http://www.gipscorp.com/default/backgrounder.html.

Indosoft Inc., Teleconferencing Bridge Features, 2005, pp. 1-6, http:/www.indosoft.ca/features.htm.

Iwatsu Voice Networks, News: Iwatsu Announces the Release of the IX-CNFBOX-1 Eight-Party Conference Bridge for ADIX, Feb. 26, 1998, pp. 1, http://ivoicenetworks.com/News/pr-cfnb.html.

NEC America, Conference Bridge Solution for the Electrak Elite IPK/IPK II, Jan. 2006, pp. 1-2, available at http://www.necunifiedsolutions.com/Downloads/PDFs/790304_EE_ JPK_II_ConfBridge.pdf.

NEC Infrontia Inc., Aspire Conference Bridge data Sheet, 2007, pp. 1-2, http://www.necaspire.com/necaspire/conference_bridge/conference_bridge.php.

Newly-released feature and enhancement highlights of "Avaya MultiVantage Software"; Release 1.2, Jan. 2003; 9 pages.

Polycom Inc., Polycom VoicePlus, Full featured PSTN and VoIP conferencing, 2003, pp. 1-2, available at http://www.ccpin.com/pdf/Polycom/VoicePlus.pdf.

Skype Journal, High Definition Voice: Bringing Skype's high Bandwidth Audio to Conference Calls, Oct. 23, 2007, pp. 1-5, http://skypejournal.com/blog/2007/10/high_definition_voice_bringing.html.

Squelch from Wikipedia; printed from Internet at: http://en.wikipedia.org/w/index.php?title=Squelch&printable=yes; 4 pages.

THOMASNET, ShoreTel Extends Portfolio of Collaboration Solutions with SIP-Enabled ShoreTel IP 8000 Conference Phone, Jul. 17, 2007, pp. 1-2, http://news.thomasnet.com/printready.html?prid=525606.

TMCNET, Aastra selects Octasic OCT6100 device for CNX Conference Bridge Appliance, Mar. 8, 2005, pp. 1-2, http://www.tmcnet.com/usubmit/2005/Mar/1123217.htm.

"Using the 79xx Status Information For Troubleshooting" available at http://www.cisco.com/en/US/products/hw/phones/ps379/products_tech_note09186a00800945bd.shtml#display, Updated: Nov. 13, 2006, pp. 1-5.

Background of the Invention for the above-captioned application (previously provided).

* cited by examiner

AUTOMATIC CONFIGURATION OF CALL HANDLING BASED ON END-USER NEEDS AND CHARACTERISTICS

CROSS REFERENCE TO RELATED APPLICATION

Cross reference is made to U.S. patent application Ser. No. 10/109,784, filed Mar. 29, 2002, entitled "EMERGENCY BANDWIDTH ALLOCATION WITH AN RSVP-LIKE PROTOCOL", to Chavez, et al., which is incorporated herein by this reference.

FIELD OF THE INVENTION

The invention relates generally to circuit-switched and packet-switched telecommunication systems and particularly to providing telecommunications services to people with disabilities.

BACKGROUND OF THE INVENTION

To allow for people having speech and/or hearing disabilities that prevent them from using conventional telephones to communicate over the public switched telephony network, text telephones or teletypewriters (TTY devices), also known as telecommunication devices for the deaf (TTD devices) have been developed. In general, such devices encode characters of text using sequences of audible tones. In particular, in response to receiving a command to transmit a character, a TTY device will generate a sequence of audible tones that is transmitted through the telephone network to a similar TTY device at the receiving end. The TTY device at the receiving end decodes the sequence of audible tones, and displays or otherwise outputs the encoded character.

Figure 1:
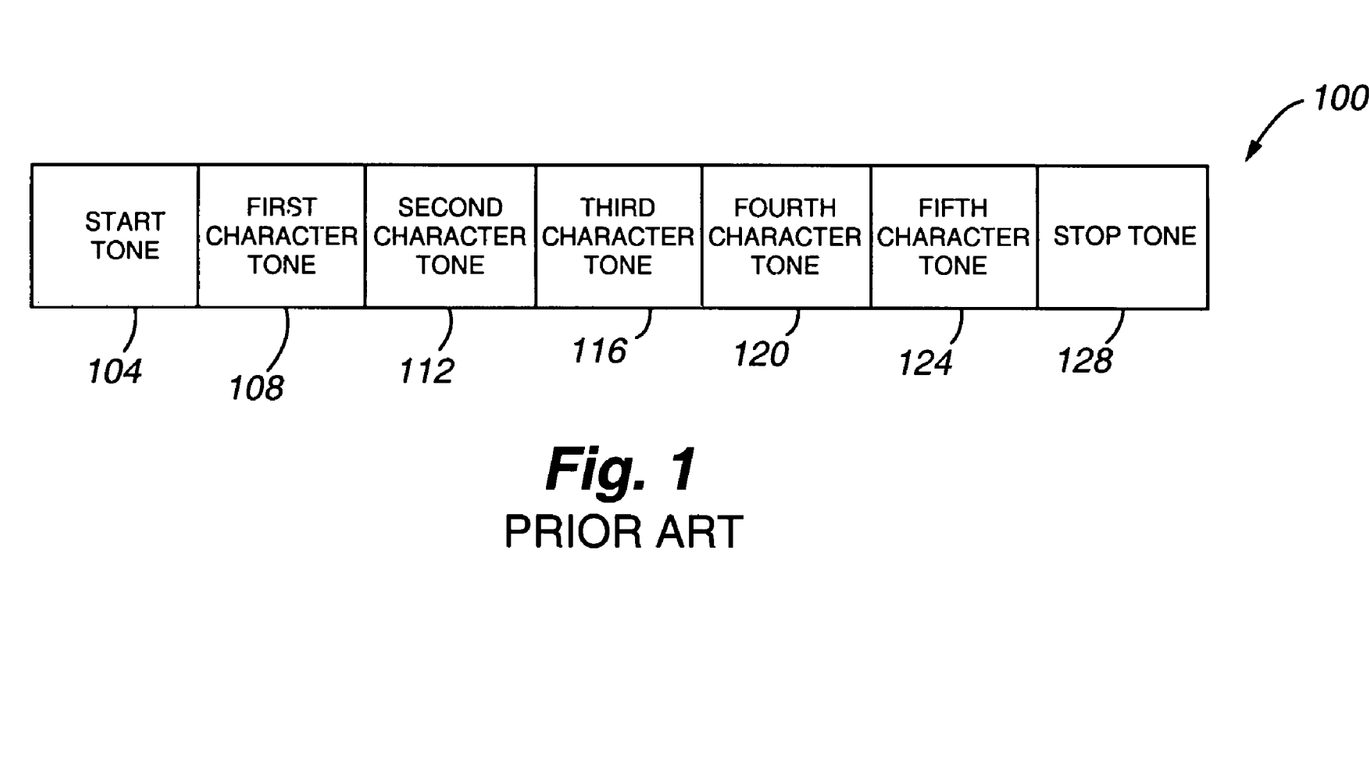
FIG. 1 is a depiction of a prior art TTY character structure.

In the United States, TTY devices communicate with one another using a 45.45 baud frequency shift key protocol defined in ANSI/TIA/EIA 825 "A 45.45 Baud FSK Modem," commonly referred to as Baudot signaling. Baudot signaling transmits characters using a sequence of seven audible tones at either 1400 Hz or 1800 Hz. As shown in FIG. 1, a Baudot or TTY character 100 comprises a start tone 104 of 1800 Hz, five tones 108-124 of either 1400 or 1800 Hz to signal the series of five bits specifying the character, and a stop tone 128 of 1400 Hz. The stop tone 128 is a border separating this TTY character 100 from the next. To provide both numbers, letters, and punctuation marks, each TTY endpoint operates in two modes, namely a number/figure mode and a letter mode. Communication between two persons using standard TTYs can only occur in one direction at a time. Thus, the communicants must take turns sending and receiving.

Because the TTY protocol can be slow and tedious for users and requires both endpoints to be configured for TTY generation and transmission, other telecommunication features have been used to provide substantial benefits to persons with hearing and voice impairments. For example, Voice over IP or IP telephony can provide both audio and video speaker feedback to a listener. The ability of a listener to read lip movements synchronized with speech can compensate a listener for up to 20 db of hearing loss. Moreover, sign language can be conveyed to the listener much faster than TTY characters can be inputted and transmitted by the speaker.

Unfortunately, the communication network's desire to allow maximal use of network resources to the broadest number of people can severely impair the abilities of disabled persons to use the network effectively. For example, an audio coder/decoder or codec standard of G.729 (which is commonly employed to conserve bandwidth) will interfere with the effective transmission of TTY tones while the G.711 code standard will not. A slow video refresh rate, low screen resolution, and/or poor degree of synchronization between audio and video streams, which are often employed to conserve bandwidth, can interfere dramatically with a listener's ability to compensate for hearing loss by reading the speaker's lips.

Moreover, when people (illustratively agents in a Public Safety Access Point) receive an emergency call from an unknown party who has a disability (illustratively, a hard-of-hearing person who uses a TTY), the process by which the called parties identify the caller's disability-related communications needs and then adjust themselves appropriately can be cumbersome, and time-consuming It is important to note that, unlike computer modems and fax machines, TTY devices do not emit a "handshake tone," thereby making it considerably more difficult for network resources to determine automatically, during the call set-up process, that a TTY is in use. For example, when a PSAP answers a call to a universal emergency number the agent responds with a standard spoken greeting and typically receives a silent, open line in return. After waiting an appropriate period of time, the agent queries the line verbally a second time. If the same response is received, the agent (after a substantial amount of time has expired since the call was received) queries the line using a TTY to determine if the call is from a TTY user. This prolonged delay can be fatal to the caller in certain types of emergency calls. Similar prolonged call delays are encountered when a non-disabled person initiates a call to an individual who turns out to have a communication-related disability.

TTYs have been modified to reduce the delay but the modified TTY s either require manual input or are not widely in use. Some TTY devices have the ability to generate a voice announcement, namely "I am a TTY user". The TTY triggers the announcement in response to manual user input. Such input is not always done by the caller, particularly in an emergency situation. Some TTY s use a proprietary protocol developed by UtraTec™ that can detect automatically a TTY user at the other end of the call when a specific acoustic signal from the other end is detected. However, if the acoustic signal is absent because the sending endpoint is not configured to send the signal or the signal is lost or corrupted during transmission, the receiving endpoint will not detect automatically the sending TTY and fail to reconfigure itself accordingly.

Currently, networks have only a limited ability to reconfigure themselves based on user needs and particularly disabled user needs. It is important to note that many TTY devices are used in conjunction with standard telephone endpoints, and are connected to these telephones by placing the phone's handset into an acoustic coupler on the TTY. For this reason, it is not possible to rely on a telephone of the prior art to provide appropriate TTY-specific call set-up information. For example, Information Indicators or II digits in the Integrated Services Digital Network protocol allow for a network to reconfigure itself based on the characteristics and/or permissions of the calling terminal. In the Session Initiation Protocol or SIP, a presence server maintains information regarding not only the user's presence and availability but also the capabilities (e.g., supported codecs) of his or her associated communication devices. This information, particularly information about the capability of an endpoint, is provided as part of the call set-up handshake procedures. In many contact centers, caller identifiers have been used to determine routing destinations and cause information associated with the identified caller to be retrieved and provided to the agent assigned to service the caller. It has been suggested by Henning Schulzrine, in a document entitled "Emergency Call Services for SIP-based Internet Telephony", that the call setup can provide additional medical background, without having to store the information in a central database and that the ability to indicate language capabilities of the caller can help route the call to an operator, without the additional delay of having a general operator try to ascertain the language of the caller.

Nothwithstanding these limited measures, there remains a need for a communications network that can configure or reconfigure itself automatically to reflect the unique demands imposed by a telecommunications interaction with a disabled person.

SUMMARY OF THE INVENTION

These and other needs are addressed by the various embodiments and configurations of the present invention. The present invention is generally directed to a system and method for the configuration and/or reconfiguration of a network component, such as a communication device, server, switch, or router, to accommodate a contactor or contactee with certain types of disabilities, such as hearing or speech loss or impairment. As used herein, a "disability" refers to any physical or cognitive impairment, including partial or total hearing loss, partial or total vision loss, partial or total speech loss, partial or total mobility loss of a body member, an inability to understand or follow complex instructions, an inability to remember more than a few menu options, and the like.

In a first embodiment of the present invention, a method for establishing a communication between a contactor and a contactee is provided that includes the steps of:

(a) determining a network configuration requirement resulting from a disability of at least one of the contactor and the contactee;

(b) incorporating the disability network configuration requirement in a communication set-up message; and (c) forwarding the communication set-up message to a communication device associated with the contactee. A "communication set-up message" refers to any message that is exchanged between two communication devices as part of the process of initiating and connecting a communication, such as a call set-up message, an INVITE message, an OK message, a PATH message, facility request message, information message, and a RESV message.

Examples of configuration requirements include a codec standard used by intermediate nodes and endpoints for session communications, a refresh rate for video images associated with the communication session, a screen resolution level for video images associated with the communication session, a degree of synchronization between audio and video streams associated with the communication session, a message priority for messages exchanged during the communication session, color and contrast for video images associated with the communication session, and the structure of the menus in automated attendant, IVR, and voice mail systems. As will be appreciated, the communication session can be a live voice interaction, such as a phone call, and/or a text interaction, such as email, instant messaging, and web chat. The session may, but does not have to, be in real-time. Regarding the application of the invention to web chat, the implementation can be problematic. If an attempt is made to slowdown the rate at which a web chat room's text is delivered to the terminal of a visually impaired user while maintaining at high speed text delivery at the terminals used by people with normal vision, the visually impaired user would fall far behind in a conversation. On the other hand, if the rates at which a web chat room's text was delivered to the terminals of both participants are slowed down to accommodate an impaired user, there is a risk that the unimpaired user will leave the chat room to find a faster chat room because he thinks the chat room has technical difficulties. If an unimpaired user is informed why the text rate is slower, namely that another participant is a visually impaired user, the privacy rights of the impaired user may be violated even if the specific terminal is not identified.

The message normally includes a disability indicator indicating the disability of the contactor and/or contactee. The indicator may be a flag or any other type of variable indicating that the disability condition holds or exists. The indicator may or may not indicate the specific nature or type of disability. It may simply indicate that the existence of the disability. The indicator is typically located in the packet header to be viewed by intermediate nodes, such as routers.

The presence of the indicator in a set-up message can permit information about an end-user's communication-related disabilities to be considered not only by endpoints but also by intermediate nodes (e.g., routers) such that, when the indicator is detected, automatic and appropriate reconfiguration of the network's transmission characteristics (e.g., bandwidth for the communication) and/or the other party's endpoint is achieved to guarantee at least a minimally satisfactory network configuration for the disabled user. Illustratively, if the system learned during the call initiation process that one of the parties was a TTY user, it could activate the network's TTY-on-IP adjunct and ensure that a TTY-compatible resource was activated at the other endpoint. The automatic reconfiguration of the network and of the device at the other end of the call can not only optimize the link from one endpoint to the other for the disabled person's needs but also greatly facilitate and reduce the time associated with calls to universal emergency numbers.

For the benefit of users with cognitive impairments, a group for whom the Federal Communication Commission requires accommodation, automated attendant and IVR systems could automatically adjust their menu structures so that fewer items are presented by each "node" in the menu. For users with visual impairments, video transmission characteristics could be adjusted automatically. For all users with disabilities, the "timeout" periods associated with network resources, such as automated attendants, can be lengthened automatically.

In presence-aware networks, the communication set-up message to or from the disabled user can be redirected to a first communication device (to which it is addressed) to a second, more capable communication device associated with the contactee.

To ensure the privacy of some or all of the disability-related information, the information may be maintained confidential or proprietary to the disabled person. In other words, the information is prohibited from being viewed by another unauthorized party, such as the contactee.

The disability-related information may be obtained directly as input from the user or indirectly through tracking of the user's interaction with his associated communication device(s). For example, the time typically required to input a telephone number, the number of rings typically required for the user to answer the phone, and the volume level on the telephones speaker or microphone can be used to identify not only the existence and type of disability but also the impact of the disability on the user. From this information, the specific network configuration needs of the user can be determined, such as by using a table mapping the type and/or degree of disability against appropriate network configuration requirements.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having a private branch exchange (PBX) or other similar contact processing switch or server, the invention is not limited to use with any particular type of communication system switch or server or configuration of system elements. Those skilled in the art will recognize that the disclosed techniques may be used in any communication application in which it is desirable to provide improved disabled caller service. The term "contact" or "call" as used herein is intended to include not only telephone calls but also non-telephonic communications, such as data transmissions such as electronic mail, voice-over-IP, instant messaging, teletypewriter (TTY), facsimile, etc., whether circuit switched or packet switched.

Figure 2:
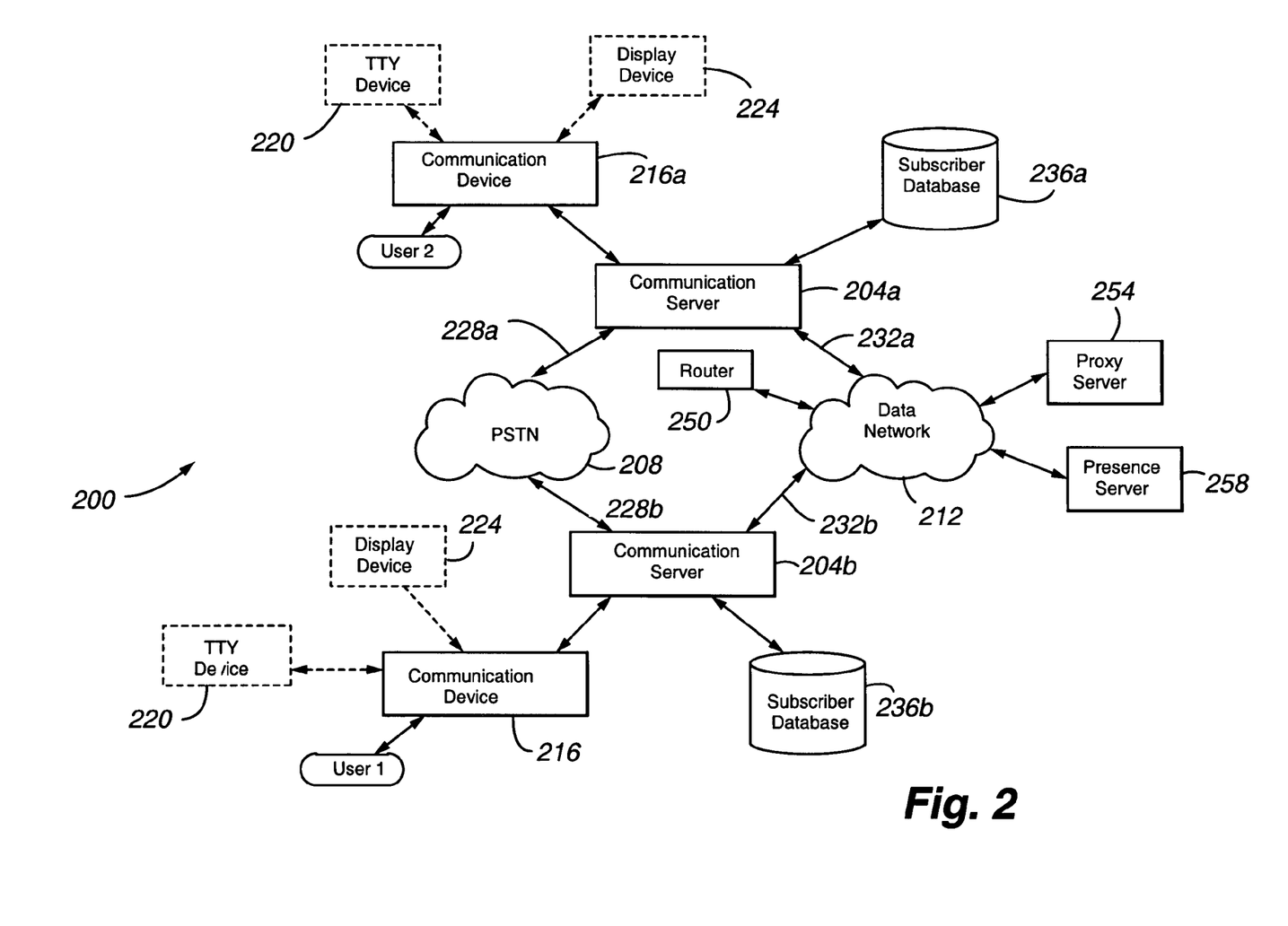
FIG. 2 is a block diagram depicting a communication system in accordance with an embodiment of the present invention.

FIG. 2 shows an exemplary communication architecture 200 in which the invention is implemented. The architecture 200 includes a communication servers 204a,b, each of which is connected to a circuit-switched network, depicted as the Public Switched Telephone Network or PSTN 208, and a packet-switched network 212, which is commonly a Wide Area Network. The WAN 212, in one configuration, is a data or distributed processing network, such as the Internet, and typically applies the TCP/IP suite of protocols. The WAN 212 can include a number of components, including a plurality of routers 250 to route packets, such as by least cost routing, a plurality of proxy servers 254 to perform contact routing, session management, redirect functions, routing to media gateways, and user authentication, and a plurality of presence servers 258 to provide subscriber domain names or locations, subscriber profiles and registration, and other subscriber-related presence and availability information. Each server 204a-b is connected to and serves a number of packet-switched or circuit-switched communication devices 216a,b that are registered with the corresponding communication server 204a,b, respectively. "Registration" is a process by which a communication device is made known to a server. As will be appreciated, the registration can be performed by any technique or according to any protocol (e.g., such as H.323, SIP, 802.11, ReSerVation Protocol or RSVP, digital port initialization, and the like) and may by effected by the system administrator and/or through another suitable manual or automated technique.

The communication devices 216a,b optionally include a TTY device 220 and/or a display device 224, such as a computer monitor or LCD display. Each of the communication devices 216a,b may be wired desktop telephone terminals or any other type of wired or wireless device capable of communicating with the switch/server. The word "communication device" as used herein should therefore be understood to include not only wired or wireless desktop telephone terminals but also other types of processor-based communication devices, including without limitation mobile telephones, IP telephones, IP softphones, IP hardphones, personal computers, laptop computers, personal digital assistants (PDAs).

Each of the communication servers serves a corresponding enterprise network and is in communication with a separate subscriber database 236a,b that include a variety of information, including server and device configuration information, device capabilities/requirements, and subscriber information, such as subscriber identity, disability (if any) or other subscriber physical or cognitive needs, subscriber media requirements, and the like.

The term "communication server" as used herein should be understood to include a PBX, an enterprise switch, or other type of telecommunications system switch or server, as well as other types of processor-based communication control devices such as computers, adjuncts, etc. Each of the servers enable communications to be forwarded across the networks 208 and 212 according to a packet data protocol, such as the Voice over Internet Protocol or VoIP or some other Real Time Protocol (RTP), H.323, SIP, Differentiated Services or Diffserv Protocol, RSVP, and the like or a circuit-switched protocol, such as ISDN. In a preferred circuit-switched configuration, the TTY tones themselves are sent and in a preferred packet-switched configuration, the TTY tones are described in an RTP stream rather than the tones being sent themselves. For packet-switched communications, the tones may be described according to RFC 2833 which defines the RTP payload for dual tone multiple frequency (DTMF) tones telephony tones and telephony signals. This avoids various problems related to packet loss and ordering often experienced in packet data communications networks that would result in inaccurate reproduction of the tones and loss of encoded characters if the tones themselves are sent. In an exemplary embodiment the communication server may be implemented as an otherwise conventional Definity™ or Multivantage™ Enterprise Communication Service (ECS)™ communication system or Avaya Communication Manager™ switch available from Avaya Inc. Other types of known switches/servers are well known in the art and therefore not described in detail herein.

Each of the communication servers 204a,b is coupled via one or more communication lines 228atb and 232a,b to networks 208 and 212t respectively. In one configuration the communication line 232 is packet-switched while the communication line 228 is a circuit-switched trunk line. The lines carry incoming and outgoing contacts from the networks to the communication server for processing. Preferably, the networks or other transit networks between the user's communication device and the communication server and between the communication servers are configured such that the server receives not only the intended destination address but also the source address or identity of the communication device initiating the contact.

It should be noted that the invention does not require any particular type of information transport medium between the servers and the communication devices or between the servers, i.e., the invention may be implemented with any desired type of transport medium as well as combinations of different types of transport media and with any desired type of network connection.

It should be emphasized that the configuration of the servers, communication devices, and other elements as shown in FIG. 2 is for purposes of illustration only and should not be construed as limiting the invention to any particular arrangement of elements.

Figure 3:
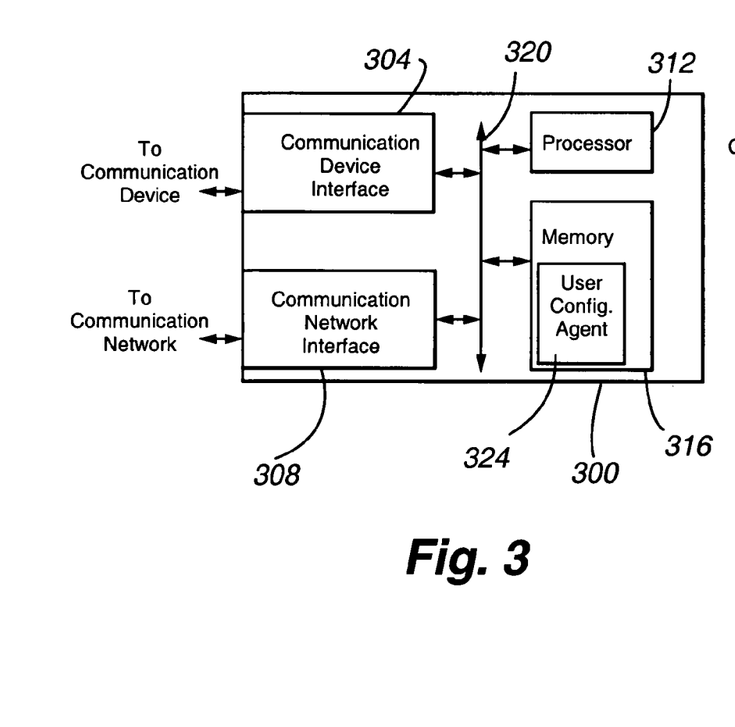
FIG. 3 is a block diagram depicting a communication server in accordance with an embodiment of the present invention.

With reference to FIG. 3, the servers 300 each include a number of interfaces, including a communication device interface 304 and a communication network interface 308, a processor 312, and a memory 316. The various components may be interconnected to one another by an internal bus 320. The communication device interface 304 type is determined by the interconnection between the communication device and the server. For example, when the interconnection between the communication device and the server is a packet-data type network, the interface may include a packet data interface. When the interconnection is an analog interconnection, the interface may include a tip-ring type interface. The communication network interface interconnects the server to one of the networks 208 and 212. If the interface interconnects the server to the network 208, the interface 308 is configured as a circuit-switched analog or digital interface, and, if the interface interconnects the server to the network 212, the interface 308 is configured as a packet-switched interface. In the architecture 200, the server 300 will include two such interfaces 308, one for the network 208 and one for the network 212.

The processor 312 generally operates to execute instructions, for example stored in the associated memory 316 or memory integral to the processor 312. Accordingly, the processor may include a general purpose programmable processor, Digital Signal Processor or DSP, or controller. The processor may implement functions represented by the user configuration agent 324 described below.

The memory 316 may store instructions, such as those represented by the agent 324, for controlling operation of the processor. The memory may include any data storage device, such as a solid state memory, a hard disk drive, or read only memory. As will be appreciated, the processor and memory may be implemented as an integrated controller-type device. The server may include additional elements that are omitted from FIG. 3 for simplicity and clarity of illustration. For example, the server may include an external database to store system configuration information, a gateway, a gatekeeper, a multipoint control unit, a registrar, a proxy server, a redirect server, service circuits such as tone generators, announcement circuits, etc., and a port card for each type of user communication device associated therewith. Also associated with the server may be an administrator terminal (not shown) which is used to program the operation of the switch/server during system administration, e.g., an initial set-up and configuration of the system of a subsequent system-level or user-level configuration. Other devices not shown in the figures may be associated with the server, such as an adjunct feature server. Such an adjunct server may be physically incorporated within the server and may be partially or completely implemented using other server elements such as the processor 312 and memory 316.

Figure 4:
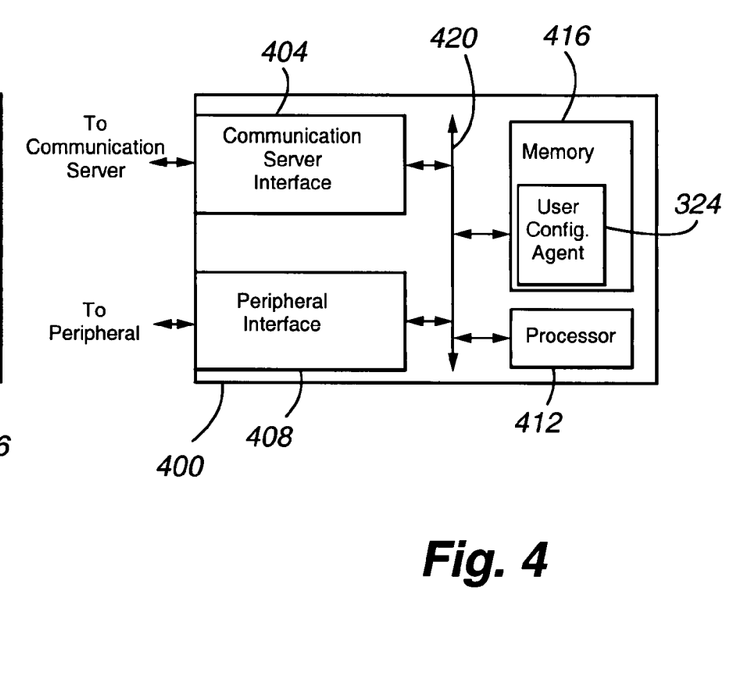
FIG. 4 is a block diagram of a communication device in accordance with an embodiment of the present invention.

FIG. 4 illustrates, in block diagram form, an embodiment of an intelligent communication device. The communication device 400 includes a communication server interface 404 to handle communications between the device and the corresponding server, a peripheral interface 408 to handle communications between the device and one or more peripherals, such as the TTY device (or keyboard) 220 and display device 224, a processor 412, and a memory 416. Communications between/among the various components can be transmitted along internal bus 420. The processor executes instructions, such as the user configuration agent 324, stored in the associated memory 416 (which is the configuration depicted in FIG. 4) or memory integral to the processor 412. The processor may include a general purpose programmable processor, Application Specific Integrated Circuit or ASIC, or DSP. The memory 416 may include any computer data storage device, such as solid state memory, a hard disk drive, or read only memory.

The user configuration agent 324 is configured, as part of the call set-up handshake procedure, to include disability-related information about the user so that the contacted endpoint and/or intermediate nodes, as appropriate, can automatically reconfigure itself/themselves to respond to the user's specific disability-related needs. The disability-related network and transmission requirements are typically embodied as a guaranteed quality of service, grade of service, or class of service.

The disability-related information can include specific network and transmission requirements (e.g., a codec standard for transcoding communication messages, video refresh rate of the display device 224 during the communication, screen resolution of the display device 224 during the communication, degree of synchronization between video and audio streams during the communication, color and contrast of video during the communication, etc.), necessitated by the disability, identify the nature of the disability, identify the required configuration of the receiving endpoint (e.g., initiate automatically the TTY-on-IP adjunct such as implemented by Avaya Inc. in the version 2.0 release of Communication Manager™), and/or direct the communication to a specific communication device associated with the contactee that has the capabilities (e.g., an adequate display device 224) capable of satisfying the contactor's disability-related needs, etc.), the time-out periods for network resources (i.e., how long they will wait for an input from the user before terminating the connection), and the structures of the menus in automated attendant, IVR, and voicemail systems. The agent 324 may receive the disability information from a presence server 258 associated with the contactee a subscriber database associated with the contactor, and/or the internal memory 316 of the communication server or the communication device 416. The user can have the information stored on a portable USB device that he simply plugs into the communication device to transmit the information.

The disability-related information can be included in a variety of different messages depending on the protocol. For example, in SIP the information can be included in the INVITE, TRYING, RINGING, ACK, and/or OK message. In RSVP, the information can be included in the PATH, RESV, PATHTEAR, PATHERR, and/or RESVCONF message. In H.323, the information can be included in the Caller Setup, Caller Proceeding, Alerting, Call Connected, Call Terminate, and/or Acknowledge message. The information can also be included in a DiffServ packet.

In packet-switched applications, the pertinent disability information can be included in a number of different packet locations. When the information involves network and transmission requirements, such as codec standard for transcoding, video refresh rate of the display device 224, screen resolution of the display device 224, and/or degree of synchronization (or the maximum acceptable delay) between video and audio streams, the requirements are included in the same packet locations as the information is currently located. For example, in SIP some of the information may be included in the Session Description Protocol or SDP fields. As will be appreciated, SDP fields include information, such as session name and purpose, time(s) the session is active, information about the bandwidth to be used by the session, contact information for the person responsible for the session, type of media (such as video and audio), transport protocol (such as RTP/UDP/IP and H.320), media format (such as H.261 video and MPEG video), multicast address and transport port for media, and remote address for media and transport port for contact address. In the ReserVation Protocol, some of the information may be included in the Flowspec, namely in the R-spec, which defines the QoS being requested and/or T-spec, which defines the traffic characteristics. When the information involves non-standard disability-related information, such as the type or nature of the disability and special needs of the disabled user, the information may be in the packet header and/or body, such as in an "other" information or "reserved" field. The information can be maintained in one or more proprietary fields to maintain user privacy and prevent the disability-related information, such as the type or nature of the disability, from being accessed by unauthorized individuals. It is preferably only revealed to the intermediate node or endpoint and not to users thereof. This may be desirable for example to comply with federal and/or state regulations, such as the patient privacy requirements of the Health Insurance Portability and Accountability Act of 1996.

In circuit-switched applications, the disability-related information can be conveyed through distinctive sets of tones, such as by DTMF digits or by ANI II digits, and the like.

The disability-related information can be obtained in a variety of ways and at a variety of different times. First, the user can provide the information in response to a set of queries provided by the communication device/server. The provided disability can be mapped to a table of default transmission requirements for the provided disability to yield the transmission requirements for the communication session. In this configuration, the user can specify the extent of the impairment or respond to test protocols to ascertain the degree of the impairment. For example, for hearing impairment a series of tones of different frequencies and/or volumes can be played to the user and the user asked to indicate whether or not he heard each tone. For persons having mobility impairment, the individual can be requested to type a series of designated keys at differing keyboard locations to determine a time required by the user to operate a TTY or keyboard. This information can be used to appropriately set timeouts (such as for dialing a number, for dialing a digit (such as inter-digit timeout), and responding to a request), provide an ability to ignore inadvertent double-presses of a key, set a higher number of rings before a call proceeds to call coverage, set fewer menu choices on automated voice prompts, and/or automatically generate notification messages to the other endpoint to avoid premature termination of a contact. When the disability-related information is collected, the information can be mapped to a table to obtain appropriate transmission characteristics. The information can be provided by the user at the beginning of the communication or at some earlier time during device configuration.

The operation of the user configuration agent will now be described with reference to FIGS. 2-6. As will be appreciated in the subsequent discussion, the agent 324 may be implemented in the communication device and/or the communication server. For unintelligent communication devices, such as analog or digital desk phones, the agent 324 will be commonly located in the communication server 300. For intelligent communication devices, such as PC's, laptops, and IP hardphones, the agent 324 is commonly located in the device itself.

Figure 5:
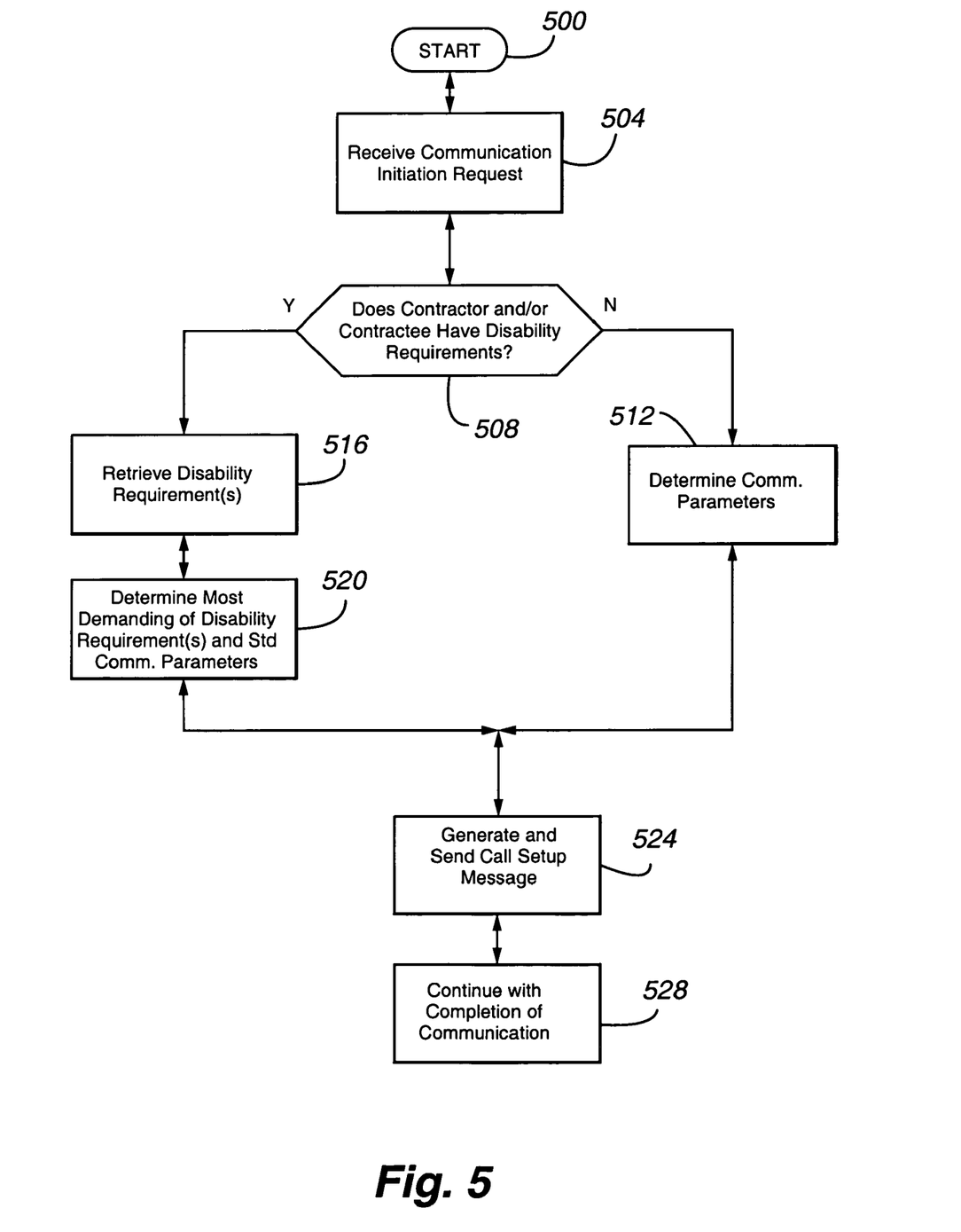
FIG. 5 is a flowchart of the operation of a user configuration agent in accordance with an embodiment of the present invention.

In step 500, the user, such as user 1 (or the first user) in FIG. 2, initiates a contact, such as by inputting a telephone number, IP address, or other type of electronic address. The contact may be circuit-switched or packet-switched.

In step 504, the communication device 400 or server 300 receives the communication initiation request from the first user and invokes the agent 324.

The agent 324, in decision diamond 508, determines whether or not the contactor and/or contactee have a disability or physical impairment requirement. This can be done by retrieving the user profile in internal memory 316, 416, the database 236b, and/or the presence server 258.

If the first user has no disability or physical impairment requirement, the agent 324 permits the communication set-up to proceed in the normal or conventional manner in step 512.

If the first user has a disability or physical impairment requirement, the agent 324, in step 516, retrieves the disability-related information and, in step 520, determines the most demanding of the disability requirement(s) and the standard or default communication parameters to ensure that the required bandwidth and other network resources will be reserved (guaranteed) for the communication session. For example, the standard or default codec standard may be a G.729, which will distort the TTY tones in a circuit-switched or packet-switched application. Where the disability is hearing impaired and a TTY will be used by the first user, the requirement demanded for all intermediate nodes and each endpoint will be a codec standard of G.711. Moreover, the agent invokes the TTY application in the contacting communication device, which causes, for packet-switched communications, representations of the TTY tones to be packetized, and includes a request (in the call set-up message) to the contacted communication device to invoke the TTY application, which includes reconstructing the TTY tones. For a hearing impaired person who will use lip reading and an audio stream to conduct the communication or wishes to use sign language, the requirement demanded for all intermediate nodes and each endpoint is a bandwidth, packet priority, and/or display device configuration sufficient to satisfy a specified refresh rate, degree of synchronization, and/or screen resolution. Additionally, the proxy server 254 will select from among the contactee's (or user 2 (the second user)) numerous associated endpoints, that endpoint having a corresponding display device 224, even if the number dialed by the first user is to a desk phone having no corresponding display device 224.

In step 524, the agent 324 generates and sends the call set-up message to the contacted endpoint and, in step 528, continues with the completion of the communication.

Figure 6:
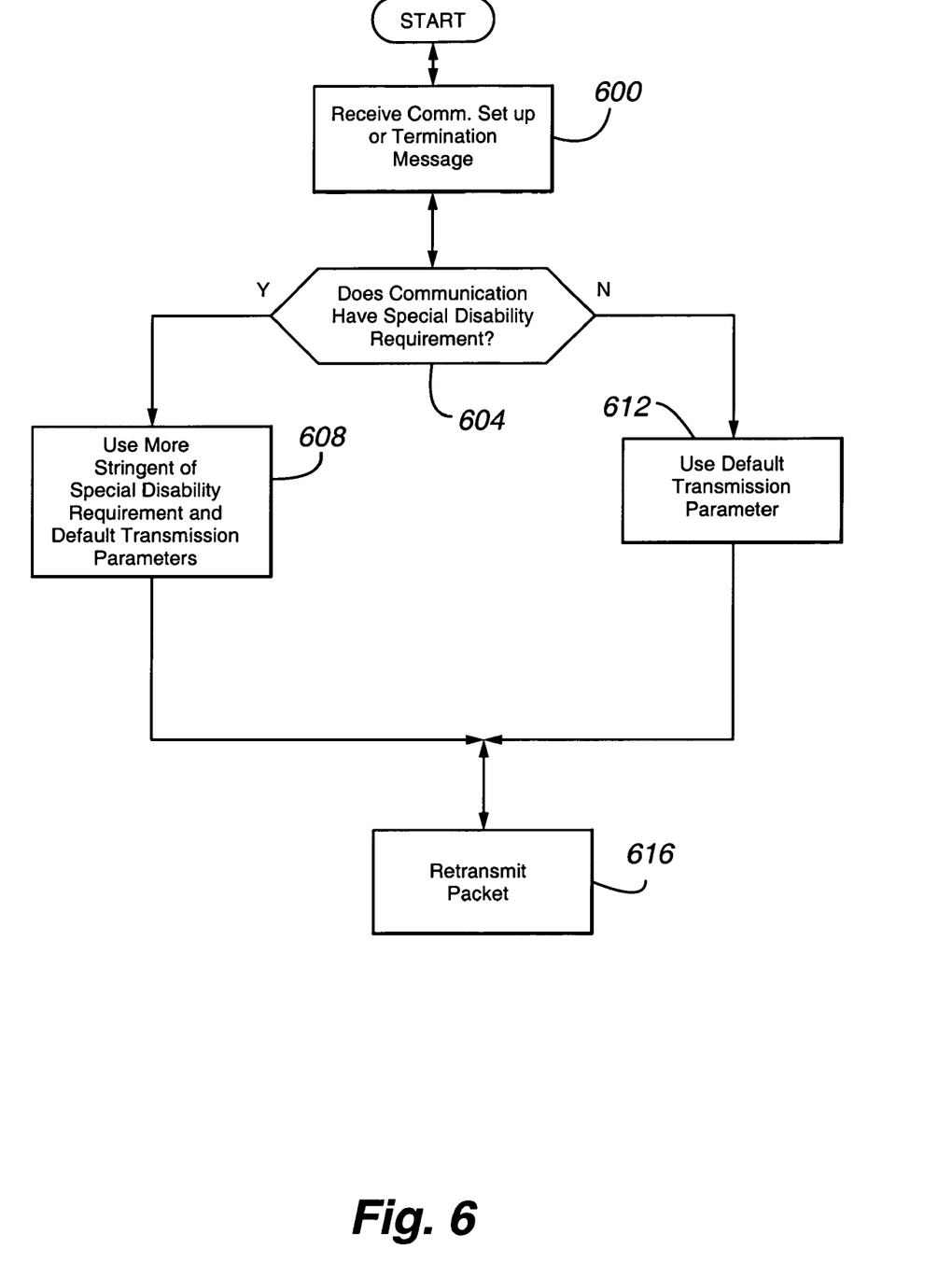
FIG. 6 is a flowchart of the operation of a router in accordance with an embodiment of the present invention.

FIG. 6 depicts the operations of an intermediate node, such as a router, that receives, in step 600, the call set-up message from the agent 324. In decision diamond 604, the user configuration agent in the router (not shown) determines whether or not the communication has a special disability requirement. This is typically established by a flag or other indicator in the packet header. If the packet includes such an identifier, the agent, in step 608, confirms that sufficient network resources (or bandwidth) is available for the communication and reserves the appropriate bandwidth notwithstanding the volume of other network traffic. This can include for video assigning to audio and video session packets the same DiffServ or RSVP values. If there is not sufficient resources available for the communication, the reservation is denied or the packet redirected to another communication path between the contacting and contacted communication devices. In an emergency call, the reservation is not denied but sufficient resources are removed from other traffic to establish the required communication path bandwidth and permit the communication to be forwarded to the next hop. If the packet does not include an identifier, the agent, in step 612, processes the message in a manner consistent with the governing routing protocol. In step 616, the packet is forwarded to the next hop.

Figure 7:
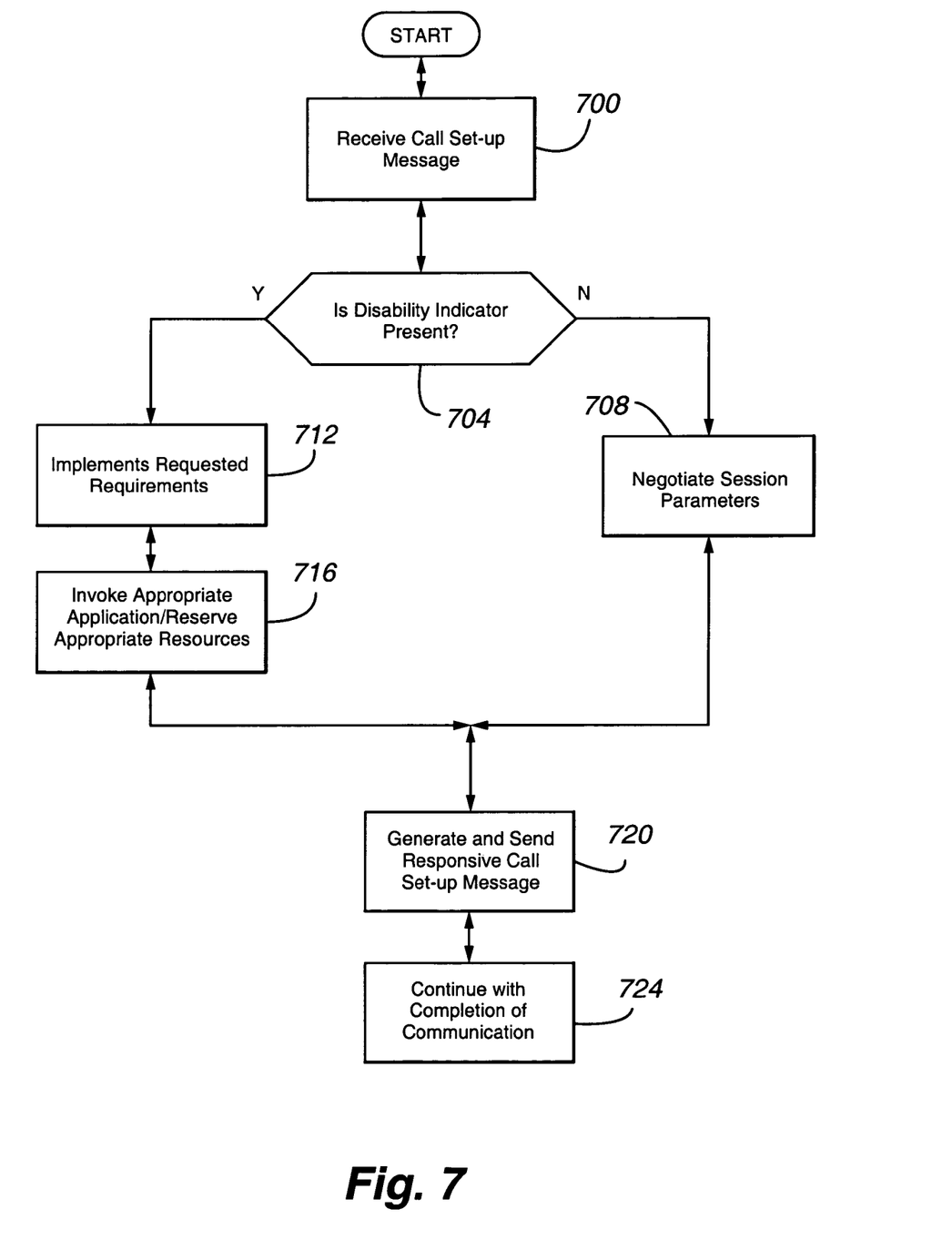
FIG. 7 is a flowchart of the operation of a node in accordance with an embodiment of the present invention.

The operation of the contacted communication device will now be discussed with reference to FIG. 7.

When the call set-up message is received in step 700, the contacted communication device or server invokes the agent 324. The agent, in decision diamond 704, determines from the packet whether a disability indicator is present. If not, the device/server, in step 708, negotiates session parameters with the contacting device as determined by the governing protocol. If so, the agent, in step 712, reconfigures the communication server/device and/or a peripheral associated therewith to implement the requested requirements and, in step 716, invokes the appropriate application (such as the TTY or graphics application), and reserves the appropriate resource(s) (such as an auxiliary decoder). As noted, this may include directing the communication to one of the contactee's communication devices (other than the one to which the communication is addressed) that has the capabilities to comply with the requested parameters. In step 720, the agent generates and sends a responsive call set-up message to the contacting communication device and, in step 724, continues with completion of the communication.

A number of variations and modifications of the invention can be used. It would be possible to provide for some features of the invention without providing others.

For example in one alternative embodiment, the disability-related information can include mobility limitations, such as typing speed, to use for reconfiguration of an automated attendant or IVR. The automated attendant can be reconfigured to have a longer timeout period (for dialing a number, for responding to a request, for receiving a user response, and the like), have more rings before a call is terminated, a simpler menu structure to provide fewer options, and heuristics to detect and ignore inadvertent double-presses of a key.

In another alternative embodiment, a user's behavior is monitored to identify disability-related needs of the user. For example, the communication server can seamlessly monitor the interdigit period, the time to dial a seven-digit number, the number of rings before a call is answered, the volume level of the user's speaker and/or microphone, whether the user uses a TTY and for what type of communications, whether the user has a speech impairment that might require an automatic speech recognition resource to use a different set of modeling parameters, and the like. The learned information can be stored under the user's profile.

In another embodiment, the disability-related information is loaded by the communication server onto the user's communication device in a manner similar to the loading of a "cookie". The loaded information is thereafter automatically included in the handshake messages exchanged as part of call set-up.

In another embodiment, the disabled user must be properly authenticated before the user configuration agent will be invoked. This avoids an unnecessary reservation of bandwidth for a party other than the disabled user who uses the disabled user's communication device. It also makes the device more functional for non-disabled users.

In another embodiment, the agent uses the contacted electronic address to determine whether or not special disabled requirements are appropriate. In this embodiment, a non-disabled user contacts a disabled user. The non-disabled user's configuration agent maps the inputted address against a table to determine whether the contactee is disabled and, if so, how the communication device and intermediate nodes should be configured to accommodate the unique disability requirements. The call set-up message transmitted from the contacting communication device includes the pertinent disability requirements.

In another embodiment, the agent is implemented as software, hardware (such as an logic circuit or ASIC), or a combination of the two.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for establishing a communication between a contactor at a first endpoint and a contactee at a second endpoint, comprising:

determining a network configuration requirement resulting from at least one special need of at least one of the contactor and the contactee, the at least one special need associated with a user profile, the network configuration requirement based on a most demanding of the at least one special need and including one or more parameters that ensure network resources will be available for the communication, the one or more parameters guaranteeing that all intermediate nodes and each endpoint in a network carrying the communication can automatically reconfigure themselves to accommodate the at least one special need;

incorporating the special need network configuration requirement in a communication set-up message; and forwarding the communication set-up message to a communication device associated with the contactee.

2. The method of claim 1, wherein the special need is a disability of the at least one of the contactor and contactee, and wherein the network configuration requirement is at least one of a codec standard for the communication, refresh rate for video images associated with the communication, screen resolution level for video images associated with the communication, degree of synchronization between audio and video streams associated with the communication, message priority of the communication, color and contrast for video images associated with the communication, and the structure of a menu in an automated attendant and/or voicemail system.

3. The method of claim 1, wherein the special need is a disability of the at least one of the contactor and contactee and wherein the communication set-up message comprises a disability indicator indicating the presence of the disability of at least one of the contactor and contactee.

4. The method of claim 3, further comprising:
receiving the communication set-up message;
determining whether the message comprises the disability indicator; and when the message comprises the disability indicator, guaranteeing a bandwidth sufficient to accommodate the configuration requirement.

5. The method of claim 1, further comprising:
redirecting the communication set-up message addressed to a first communication device associated with the contactee to a second communication device associated with the contactee, whereby the network configuration requirement is implemented.

6. The method of claim 1, the special need is a disability of the at least one of the contactor and contactee and wherein the message comprises disability-related information other than the network configuration requirement and further comprising:
at least one of prohibiting and allowing at least some of the disability-related information from being viewed by the contactee.

7. The method of claim 1, wherein the message comprises a request to invoke a TTY application in the communication device.

8. The method of claim 3, further comprising:
a router receiving the message;
the router determining whether the message comprises the disability indicator; and when the message comprises the disability indicator, the router guaranteeing a bandwidth sufficient to accommodate the network configuration requirement.

9. The method of claim 3, further comprising:
an automated attendant receiving the message;
the attendant determining whether the message comprises the disability indicator; and when the message comprises the disability indicator, the attendant reconfiguring itself to accommodate the network configuration requirement.

10. The method of claim 9, wherein the attendant reconfigures at least one of the following: selecting, from among a plurality of menu structures, a menu structure having fewer options and prolonging a timeout period.

11. The method of claim 1, further comprising:
tracking the contactor's interaction with at least one contactor communication device to identify at least one special need; and using information from the tracking step to determine the configuration requirement.

12. The method of claim 11, wherein the network configuration requirement is at least one of an interdigit period and a number of rings before a communication proceeds to a coverage path.

13. A computer readable medium having stored thereon instructions, that when executed, perform the steps of claim 1.

14. A logic circuit operable to perform the steps of claim 1.

15. A computational component for establishing a communication between a contactor at a first endpoint and a contactee at a second endpoint, comprising:
a user configuration agent operable to (a) determine a network configuration requirement resulting from at least one disability of at least one of the contactor and the contactee, the at least one disability associated with a user profile, the network configuration requirement based on a most demanding of the at least one disability and including one or more parameters that ensure network resources will be available for the communication, the one or more parameters guaranteeing that all intermediate nodes and each endpoint in a network carrying the communication can automatically reconfigure themselves to accommodate the at least one special need; (b) incorporate the disability network configuration requirement in a communication set-up message; and (c) forward the communication set-up message to a communication device associated with the contactee.

16. The component of claim 15, wherein the network configuration requirement is at least one of a codec standard for the communication, refresh rate for video images associated with the communication, screen resolution level for video images associated with the communication, degree of synchronization between audio and video streams associated with the communication, message priority of the communication, and color and contrast for video images associated with the communication.

17. The component of claim 15, wherein the communication set-up message comprises a disability indicator indicating the presence of the disability of at least one of the contactor and contactee.

18. The component of claim 17, further comprising a second computational component operable to (a) receive the communication set-up message; (b) determine whether the message comprises the disability indicator; and (c) when the message comprises the disability indicator, guarantee a bandwidth sufficient to accommodate the configuration requirement.

19. The component of claim 15, further comprising a second computational component operable to redirect the communication set-up message addressed to a first communication device associated with the contactee to a second communication device associated with the contactee, whereby the configuration requirement is implemented.

20. The component of claim 15, wherein the communication set-up message comprises disability-related information other than the configuration requirement and wherein the contactee is prohibited from viewing at least some of the disability-related information.

21. The component of claim 15, wherein the message comprises a request to invoke a TTY application in the communication device.

22. The component of claim 15, further comprising a router positioned between the contactee's and contactor's communication devices, wherein the router is operable to (a) receive the message; (b) determine whether the message comprises the disability indicator; and (c) when the message comprises the disability indicator, guarantee a bandwidth sufficient to accommodate the configuration requirement.

23. The component of claim 15, further comprising an automated attendant operable to (a) receive the message; (b) determine whether the message comprises the disability indicator; and (c) when the message comprises the disability indicator, reconfigure itself to accommodate the configuration requirement.

24. The component of claim 23, wherein the attendant reconfigures by at least one of the following operations: selecting, from among a plurality of menu structures, a menu structure having fewer options and prolonging a timeout period.

25. The component of claim 15, wherein the agent is further operable to (d) track the contactor's interaction with at least one contactor communication device to identify at least one disability; and (e) use information from the tracking step to determine the configuration requirement.

26. The component of claim 25, wherein the network configuration requirement is at least one of an interdigit period and a number of rings before a communication proceeds to a coverage path.

* * * * *